Patented Jan. 20, 1931

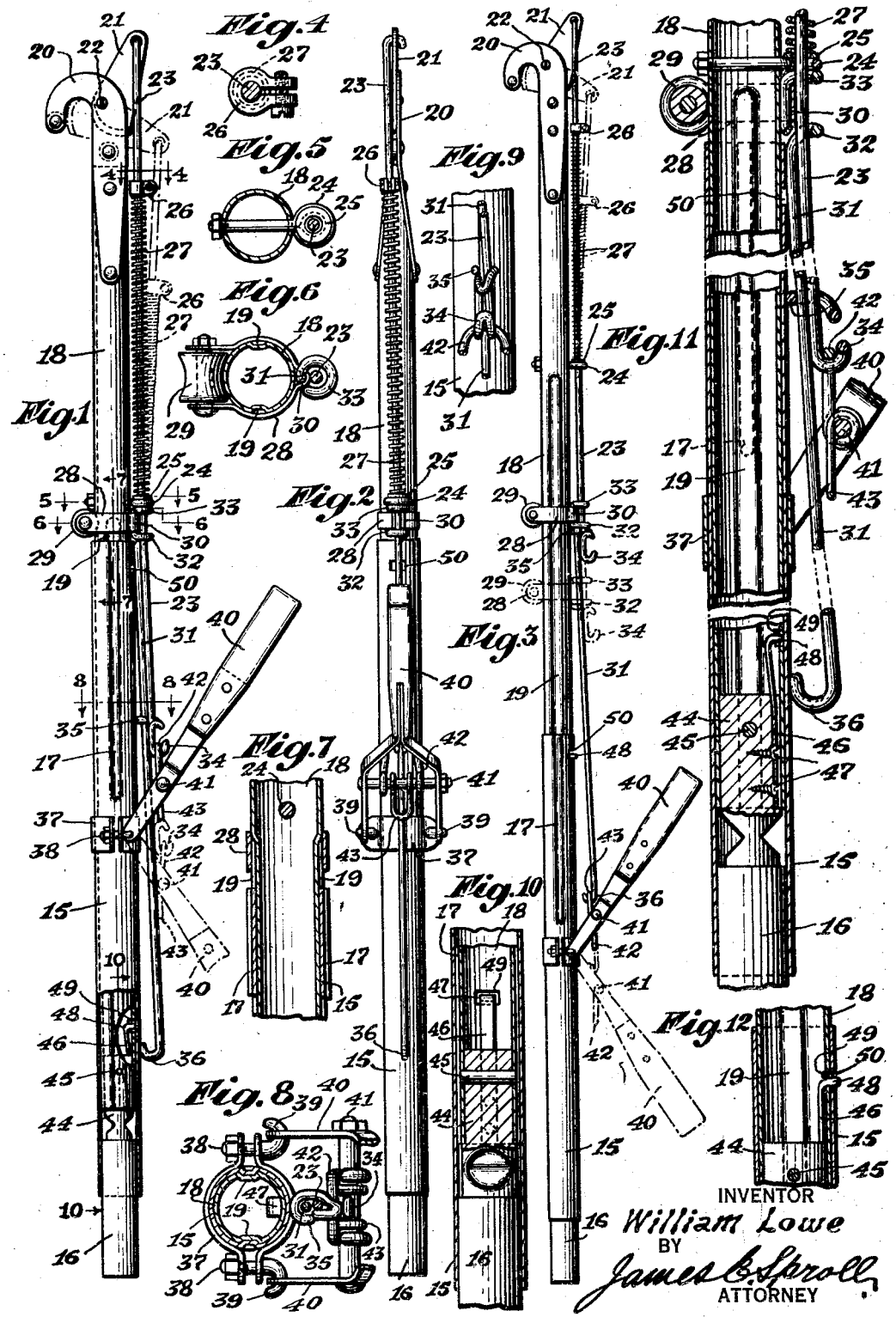

1,789,824

UNITED STATES PATENT OFFICE

WILLIAM LOWE, OF COUNCIL, IDAHO

TELESCOPIC TREE PRUNER

Application filed April 23, 1929. Serial No. 357,387.

This invention relates to telescopic tree pruners and aims primarily to provide a telescopic tree pruner, which is rapidly and readily adjusted lengthwise for operation upon trees of varying heights, whereby the pruning of such trees is materially simplified and the necessity of employing a series of tree pruners of varying lengths, as has been customary heretofore, is obviated.

Contemplated by the present invention is a telescopic tree pruner embodying a pole fabricated from a series of telescopic tubular sections; means to prevent rotative movement of said sections relative to each other; a hook rigidly secured to the upper end of the pole; a pruning blade pivotally mounted upon said hook; a spring-pressed actuating rod pivotally connected to said blade; a supplemental actuating rod slidably mounted upon the lower end of said actuating rod; a fixed guide and a sliding guide for said actuating rod; a hand lever selectively engageable with said actuating rod or said supplemental actuating rod, and means to interlock said telescopic sections in predetermined adjusted positions, all of which are important objects and primary features of the invention and are to be correlated in the broad aim of enhancing the efficiency of the device for general use.

The above, and additional objects which will hereinafter be more specifically treated are attained by such means as are shown in the accompanying drawings described in the following specification and then more clearly pointed out in the claim, which is appended hereto and forms part of this application.

With reference to the drawings, in which there is illustrated one embodiment of the invention, and throughout the several views of which like characters of reference designate similar parts:

Figure 1 is a front elevation of a telescopic tree pruner comprehended by the present invention, certain parts being broken away or omitted and certain other parts being shown in section for clarity of illustration.

Fig. 2 is a side elevation of the same.

Fig. 3 is a front elevation thereof with the sections extended.

Figs. 4, 5 and 6 are enlarged horizontal sections taken through lines 4—4, 5—5 and 6—6, respectively, of Fig. 1.

Fig. 7 is an enlarged fragmentary vertical medial section taken through line 7—7 of Fig. 1.

Fig. 8 is an enlarged horizontal section taken through line 8—8 of Fig. 1.

Fig. 9 is a fragmentary front elevation of the actuating mechanism upper terminal hook.

Fig. 10 is a fragmentary vertical section taken through line 10—10 of Fig. 1.

Fig. 11 is an enlarged fragmentary medial section of the lower half portion of the tree pruner, and Fig. 12 is a similar section illustrating the manner of interlocking the telescopic sections when the same are extended.

Beginning the more detailed description of the invention by reference to the drawings, the numeral 15 designates the lower or outer telescopic tubular section of the tree pruner having its lower end closed by a plug or handle 16 and having the walls of its upper half portion indented lengthwise at diametrically opposite points to provide longitudinally disposed ribs or ridges 17 upon the interior thereof.

Slidably mounted and telescoping within the section 15 is the upper telescopic tubular section 18 of the tree pruner, the walls of the lower half portion of which are also indented lengthwise at diametrically opposite points to provide longitudinally disposed grooves 19 upon the exterior thereof, wherein the ribs 17 of the section 15 are adapted to normally seat, to thereby positively prevent rotation of the section 18 within and relative to the section 15, while readily permitting of axial movement of the former within the latter.

A hook 20, preferably fabricated from two plates in the shape shown are rigidly secured in spaced relation, as by riveting, to the upper wedge-shaped terminal of the telescopic section 18, and interposed between said plates is an oscillative cutting blade or pruning knife 21, which is pivotally mounted or connected to the plates by a screw or pin 22.

Pivotally connected to the outer end of the cutting blade 21, is the hook-shaped upper terminal of a dependent main actuating reciprocative rod 23 guided for reciprocation at a point substantially midway its length within a fixed guide or eye 24 rigidly secured to the casing 18, as shown more clearly in Figs. 5 and 11. Loosely mounted upon the rod 23 and normally resting upon the eye 24 is a washer or collar 25, and mounted upon the rod 23, adjacent its upper end, for selective adjustment thereon is an adjustable collar 26. Mounted upon the rod 23 and interposed between the washer 25 and collar 26 is a helical compression spring 27, the compression upon which is varied by the adjustable collar 26, and the function of which is to effect retraction of the cutting blade 21 following a cutting operation.

Slidably disposed upon the telescopic tubular section 18 below the eye 24 is a band 28 having an anti-friction roller 29 mounted upon one side thereof and at a diametrically opposite point thereon is outwardly offset to form a loop 30 thereat, wherethrough the upper terminal portion of a dependent supplemental actuating reciprocative rod 31 extends, said portion being return bent immediately below said loop 30 to form an eye 32 therein and being similarly bent immediately above the loop 30 to form an eye 33, which eyes 32 and 33 are adapted to respectively abut the lower and upper ends of the loop 31 and serve and function thereat to connect the upper terminal portion of the supplemental actuating rod 31 to the sliding band 28 and also positively prevent independent movement of such rod relative to said band. The band 28 with its correlated parts form and constitute a sliding guide for the main actuating rod 23 and for this purpose the lower terminal portion of said main actuating rod 23 extends downwardly through the eyes 33 and 32, and at its lower end is return bent in a lateral direction, with the return bent portion outwardly bent to form a hook 34. The terminal of the return bent portion is also bent upon itself to form an eye 35, which surrounds and is slidably mounted upon the supplemental actuating rod 31, so that the actuating rods 23 and 31 are maintained and retained in normally abutting relation, as shown in the several views of the drawings. The lower end of the supplemental actuating rod 31 is provided with an inwardly directed terminal hook 36, the function and purpose of which will hereinafter be made more apparent.

Mounted for axial adjustment upon the lower tubular section 15, at a point substantially midway its length, is a sectional band 37, which band is adjustably secured in selected positions upon said section by clamping screws 38 provided at their inner terminals with hooks 39, to which are pivotally connected the bifurcated inner terminals of a hand lever 40. Mounted within the bifurcated terminals of the lever 40 is a transversely disposed pin 41, whereon are loosely mounted clevises or bails 42 and 43. The clevis 42 is adapted to normally engage the hook 34 of the main actuating rod 23 when the sections 15 and 18 of the tree pruner are telescoped, as shown in Figs. 1 and 11, while the clevis 43 is adapted to normally engage the hook 36 of the supplemental actuating rod 31, when the sections 15 and 18 of the tree pruner are extended to the full length, as shown in Fig. 3, in which extended position, such sections are adapted to be interlocked against axial movement relative to each other, and for this purpose the section 18 is provided at its inner end with a removable plug 44 adapted to be normally retained in seated relation therein by a transversely disposed pin 45. A resilient locking member 46 is adapted to be fixedly secured by screws 47 to the side of the plug 44 and to have its free upper portion extend within the section 18, said locking member 46 being bent at its upper terminal to form a catch 48, which normally projects into a slot or opening 49 formed in the walls of the section 18, when the latter is telescoped within the section 15, as shown more clearly in Fig. 11, but, which also projects into a slot 50 formed in the section 15 adjacent its upper end, when the section 18 is extended, substantially in the manner illustrated in Figs. 3 and 12, to thereby interlock the sections 15 and 18 against axial movement relative to each other.

In the operation of the device, assuming the same is to be used in its shortened or telescoped state, the clevis 42 is engaged with the hook 34, so that oscillative movements of the handle 40 will impart reciprocative movements to the main actuating rod 23, which in turn will impart oscillative movements to the cutting or pruning blade 21, as the latter is moved from the open position illustrated in full lines in Fig. 1 to the closed or cutting position indicated in dot and dash lines therein, it being supposed that a limb or twig has been inserted within the hook 20, the cutting edge of the blade is gradually elevated, and due to the mode of construction of the hook 20 the limb or twig is held squarely for the action of the cutting blade against it, so that a clean cut is obtained.

To change the tree pruner for operations at higher levels, the clevis 42 is disengaged from the hook 34 and the section 18 drawn out of the section 15 until the catch 48 engages the slot 50, at which time the hook 36 is in proximity to the handle 40, whereupon the clevis 43 is engaged with the hook 36, and the extended tree pruner is ready for use. With the clevis 43 in engagement with the hook 36, oscillation of the handle 40 causes joint reciprocation of the main and supplemental actuating rods 23 and 31, for the reason that the eye 32 of the latter is in normal abutment with the eye 35 of the rod 23, as shown more clearly in Fig. 3, and said rods are guided during their joint reciprocative movements by the eye 24 and the band 28 sliding upon the section 18, in the manner indicated in dotted lines in Fig. 3. It will be obvious from the foregoing and by referring to the drawings that joint reciprocative movement of the rods 23 and 31 cause oscillation of the cutting or pruning blade 21, to thereby effect cutting or pruning operations therewith. It will also be manifest from the foregoing that compression spring 27 serves and functions to automatically return the blade 21 to its retracted position following each cutting operation.

To again shorten or telescope the tree pruner the operator disengages the clevis 43 from the hook 36, then disengages the catch 48 from the slot 50 and pushes the section 18 within the section 15 until the outer notched end of the plug 44 abuts the inner end of the plug 16, substantially as shown in Figs. 1 and 10. The plug 44 is preferably notched at its outer end to facilitate its withdrawal from the section 18 to effect repairs to the resilient locking member 46, or when dismantling the tree pruner.

From the foregoing it will be evident that the telescopic tree pruner of the present invention is extremely simple, compact, durable and economical in construction, is reliable and efficient in use and operation, is rapidly extended or telescoped when desired, and will not readily get out of order.

While I have herein shown and described the invention with sufficient detail to enable those skilled in the art to which it pertains to understand the mode of construction and the principles involved, it is to be understood that there is no intentional limitation herein to the specific form and precise details of construction shown and described except as expressly defined by the appended claim, and that various modifications of the same may be resorted to without departing from the invention or the benefits derivable therefrom. It is also to be understood that certain features of the invention herein disclosed may be employed in other combinations than those shown and described.

What I claim as my invention, and desire to secure by Letters Patent is:—

A telescopic tree pruner comprising a plurality of telescopic tubular sections adapted to be interlocked against axial movement when extended, means to prevent rotative movement of said sections relative to each other, a hook rigidly secured to the upper end of the innermost section, a cutting blade pivotally mounted upon said hook, a spring-pressed actuating rod pivotally connected at its upper end to said blade and depending therefrom, guide means for said rod rigidly secured to one of said telescopic sections, guide means for said rod slidably mounted upon one of said sections, a supplemental actuating rod for said cutting blade adapted for attachment to said sliding guide means, and a manually operable lever adaptable for selective engagement with said spring-pressed actuating rod or said supplemental rod whereby the cutting blade is actuated when the tree pruner is in either a telescoped or extended position.

In testimony whereof I affix my signature.

WILLIAM LOWE.